United States Patent [19]

Linke et al.

[11] Patent Number: 4,496,501

[45] Date of Patent: Jan. 29, 1985

[54] PROCESS AND APPARATUS FOR THE PRODUCTION OF ARTICLES CONSISTING OF CERAMIC MATERIAL

[75] Inventors: Walter Linke, Mauerbach; Peter Kirnbauer, Brunn; Rudolf Indra, Vienna, all of Austria

[73] Assignee: Wienerberger Baustoffindustrie Aktiengesellschaft, Vienna, Austria

[21] Appl. No.: 451,898

[22] Filed: Dec. 21, 1982

[30] Foreign Application Priority Data

Dec. 22, 1981 [AT] Austria .................................. 5520/81
Nov. 17, 1982 [AT] Austria .................................. 4194/82

[51] Int. Cl.³ .......................................... B29H 19/00
[52] U.S. Cl. ........................................ 264/37; 264/56; 264/67; 264/82; 264/150; 425/72 R; 425/308
[58] Field of Search ................... 264/37, 56, 67, 82, 264/150; 425/72 R, 308, 315

[56] References Cited

U.S. PATENT DOCUMENTS

| | | | |
|---|---|---|---|
| 2,014,269 | 9/1935 | Barbour ............................... | 264/150 |
| 2,230,309 | 2/1941 | Reed .................................... | 264/150 |
| 2,795,028 | 6/1957 | Rossier ................................ | 264/56 |
| 2,822,600 | 2/1958 | Scott .................................... | 264/67 |
| 3,297,801 | 1/1967 | Konrad ................................ | 264/67 |
| 3,310,614 | 3/1967 | Burkett et al. ........................ | 264/44 |
| 3,886,244 | 5/1975 | Bayer et al. .......................... | 264/63 |
| 4,272,894 | 6/1981 | Salviati ................................ | 264/64 |
| 4,382,051 | 5/1983 | Booth .................................. | 264/64 |

Primary Examiner—Paul Lieberman
Assistant Examiner—W. Thompson
Attorney, Agent, or Firm—Flynn, Thiel, Boutell & Tanis

[57] ABSTRACT

A process for the production of articles consisting of ceramic material comprises the steps of: extruding a starting material which is of a plastic consistency and contains clay to form a string having at least one longitudinal channel; drying, firing and cooling the string; passing a gaseous medium, for example air, through said at least one longitudinal channel of the string or sections thereof; and subsequently dividing the string or sections thereof into individual articles. There is also provided an apparatus for carrying out the process.

32 Claims, 15 Drawing Figures

PROCESS AND APPARATUS FOR THE PRODUCTION OF ARTICLES CONSISTING OF CERAMIC MATERIAL

FIELD OF THE INVENTION

This invention relates to processes and apparatus for the production of articles consisting of ceramic material.

BACKGROUND OF THE INVENTION

According to the known state of the art for the manufacture of ceramic bricks, a starting material consisting of clay in a proportion of at least 40% to 50% by weight and fillers, for example sand, in a proportion of at most 50% to 60% by weight, is prepared in a mixer with the addition of water. This gives a starting material which has a plastic consistency and which is fed to an extrusion press. The string issuing from the press is, immediately after it has emerged, divided into brick blanks by means of a cutting device, for example, a cutting harp. These blanks are then placed on boards on transport cars which convey them into a drying chamber where they are dried.

After shrinkage of the blanks has been substantially completed by this drying step and the blanks have thus reached the mechanical strength necessary for the subsequent handling, they are put next to one another in layers on burning cars, by means of which they are passed through a heating and firing kiln. The heating is necessary to avoid stresses being caused by the subsequent firing which is carried out at a temperature from about 800° C. to 1100° C. After firing is a cooling stage and then the fired hollow bricks are taken from the burning cars and are stacked, for example on pallets, for transport.

This known process has the following disadvantages:

The necessity of transferring the dried blanks from the transport cars to the burning cars is labour intensive.

High energy losses occur in particular because the blanks cool after drying and, during the separate charging and emptying of the drying chamber and the firing kiln, heat is lost therefrom.

Since the string is divided into individual blanks, which are dried and fired only subsequently, immediately after the string has issued from the press, there is a risk of the final products not being sufficiently dimensionally accurate.

Since the dried blanks are transported in the firing kiln on the burning cars which have a large mass, heating of the latter requires considerable energy which is lost during the subsequent cooling of the burning cars.

Due to the handling of the undried or dried blanks, deformations or damage occurs, resulting in a relatively high reject rate.

Due to the usual high issuing speed of the string from the press, about 20 cm/sec, strains and stresses can arise in the blanks and can, during the subsequent processing lead to damage, in particular cracks, or to fractures.

Since the load areas of conventional burning cars have a length of, for example, 2.5 m and a width of up to 6 m and are loaded with dried blanks up to a height of about 1.50 m, the volume thus formed or the size of the cross-sectional area formed by the blanks lying next to one another, as compared with the cross-sectional area of an individual brick, makes it impossible to achieve uniformity during firing. Rather, optimum values can be maintained only for a relatively small zone, that is to say for a small number of blanks. On the one hand, this leads to energy losses. On the other hand, the requisite uniformity in the properties of the finished fired bricks is not ensured.

The starting material from which conventional bricks are made has a high clay content and, in view of the fact that the shrinkage during drying or firing amounts to about 5% to 10% of the clay content, this has a large adverse effect on the dimentional accuracy of the finished fired bricks.

Finally, conventional processes require a drying chamber and a separate heating or firing kiln, which means high investment costs for the complete plant.

The present invention seeks to provide a process and apparatus for the manufacture of articles consisting of ceramic material which avoids the above listed disadvantages. This process is intended not only to enable bricks but also a large number of other articles consisting of ceramic material to be produced, and additional special effects should also be achievable.

SUMMARY OF THE INVENTION

According to one aspect of the present invention there is provided a process for the production of articles consisting of ceramic material comprising the steps of: extruding a starting material which is of a plastic consistency and contains clay to form a string having at least one longitudinal channel; drying, firing and cooling the string; passing a gaseous medium through said at least one longitudinal channel of the string or sections thereof; and subsequently dividing the string or sections thereof into individual articles. Due to the flow of a gaseous medium through said at least one longitudinal channel of the string or sections thereof, working of the inner walls of the string or sections thereof, such as, for example, modification of properties, coating or a treatment, for example drying, can be carried out.

Preferably, the division of the string or sections thereof into individual articles takes place after firing. Accordingly, articles, such as solid bricks, hollow bricks, slabs, half-shells and pipes, are produced by dividing the fired string or sections thereof.

According to another embodiment the division of the string into sections, the length of which corresponds to a multiple of the length or height of one article, takes place after drying and before filing.

Alternatively, the division of the string into sections, the length of which corresponds to a multiple of the length or height of one article, takes place immediately after the string has been extruded.

The division of the string or sections thereof into individual articles may be carried out in the transverse direction and/or the longitudinal direction. Accodingly, articles can be produced as a result of the fact that, during manufacture, they form a string having at least one longitudinal channel, whereupon the string is divided or whereupon bridges between the articles are removed, so that the individual articles result.

Preferably the string or sections thereof is or are dried, heated, fired and cooled in successive zones and is or are then divided into the individual articles, a gaseous medium being introduced, at a point of division located downstream of firing, into the at least one longitudinal channel of the string or sections thereof, the gaseous medium flowing in a direction opposite to the movement of the string or the sections thereof. Alternatively the string may be divided into sections after drying thereof and before firing, and the gaseous medium is introduced, at a point of division located downstream of drying, into the at least one longitudinal channel of the string and flows in a direction opposite to the movement of the string, the gaseous medium preferably flowing through said at least one longitudinal channel of the string or sections thereof from a location which is downstream relative to the direction of movement. The gaseous medium can also flow through the sections of the string. In another embodiment, the string is divided into sections immediately after it has been extruded, the gaseous medium being passed through at least one longitudinal channel of the sections.

When the string or sections thereof is or are divided into individual articles after firing, the gaseous medium, in particular air, can be caused to flow in at the free end of the string or sections thereof, where the latter is divided into the finished articles. In this case, the gaseous medium flows in a direction opposite to the movement of the string or sections thereof and, in the zone in which the string or sections is or are cooled, cools the latter from the inside and is itself heated and moreover, in the zone where the firing takes place, is strongly heated and finally, in the zone where drying takes place, dries the string or sections from the inside and is thus itself cooled. The gaseous medium is then discharged through the opposite end of said at least one longitudinal channel.

Even though it is known to let air flow through hollow bricks during drying, it was hitherto not possible to control this air flow, because of the high resistance in the narrow channels, as compared with the unhindered air flow along the surfaces of the hollow bricks. Due to the flow of a gaseous medium through said at least one longitudinal channel, as proposed according to the invention, drying of the string or sections thereof from the inside can thus be effected and ensured, and this leads to greater freedom from strains and to a reduced formation of cracks.

Alternatively the gaseous medium flows in any case through said at least one longitudinal channel in the zone where drying takes place. If the string is divided into sections immediately after it has been extruded, the gaseous medium is passed through said at least one longitudinal channel for drying the latter. To facilitate or to allow the gaseous medium to flow into the said at least one longitudinal channel, connection plates can be provided which are made to bear against the cut faces of the string or sections thereof and which are connected to a pressure device or suction device. Preferably, these connection plates are provided with pipe branches protruding into the longitudinal channel of the string or sections thereof.

Preferably, the rate of flow of the gaseous medium, in particular air, flowing through said at least one longitudinal channel is controlled, for example, as a function of the temperature and/or the moisture content of the gaseous medium flowing through the said at least one longitudinal channel of the string or sections thereof, or flowing out of the said at least one longitudinal channel.

In this way, it is possible to regulate the influence on or the working of the starting material by the flow of the gaseous medium. In particular, high uniformity in drying over the cross-section of the string or of the sections thereof can be achieved. Preferably water vapour absorbed by the gaseous medium flowing through said at least one longitudinal channel is recovered in a condenser and water is fed from the condenser to be mixed with ingredients for the preparation of the starting material. The gaseous medium may be passed through the condenser in contraflow and thus be heated and fed to burners of the apparatus.

The gaseous medium can be air or carbon dioxide or steam or a rare gas or a mixture thereof. Liquid powder constituents such as oil, glass powder or metal powder can be added to the gaseous medium.

Drying of the string or sections thereof from the inside can be effected by the flow of gaseous medium, in particular air or steam, through the longitudinal channel. Moreover, quite generally working, in particular refining or treatment, of the inner walls of the string or sections thereof can be effected by the flow of gaseous medium through said at least one longitudinal channel of the string or sections thereof. Thus, for example, the inner walls can be glazed or coated with metal.

Preferably the starting material which is extruded contains about 50% by weight to about 20% by weight of clay and about 50% by weight to about 80% by weight of additives which are inert during drying and firing, such as pre-burnt clay, fireclay, slag, pumice slag, natural pumice and similar materials. In this context, it is pointed out that it was hitherto regarded as not economically justifiable to admix inert additives to the starting material. Rather, as a rule, sand was used as the additive, its proportion being at most about 40% to 50% by weight. The proposal to reduce the proportion of clay considerably and to use it substantially as a binder for inert additives is based on the recognition that important advantages can be obtained in this way. On the one hand, the shrinkage of the string is thus greatly reduced, as are also the disadvantages caused by shrinkage, such as poor dimensional accuracy, the occurrence of strains and susceptibility to fracture or formation of cracks, thus caused. On the other hand, the use of a large proportion of inert additives substantially facilitates the drying step because of the improved water transport out of the string, so that, on the one hand, less energy is required for this and, on the other hand, the strains in the brick, caused by drying or by the water being removed, are greatly reduced. Expressed numerically, an energy of 3690 to 3770 kJ per kg of water to be evaporated was conventionally required, whereas the energy required for drying in a process according to the present invention and with a starting material as referred to earlier, is substantially reduced and closely approaches the theoretical value of 2680 kJ per kg of water to be evaporated.

Waste material obtained by the division of the fired string or sections thereof may be used as an ingredient of the starting material.

The string is preferably extruded and moved continuously, preferably at a speed of 0.3 cm/sec to 5 cm/sec, e.g. 1.2 cm/sec. As compared with conventional processes, the issuing speed is reduced to as low as a quarter of the conventional speed because the processing or further working of the string by subsequent drying and firing or division of the string is carried out continuously. The advantage of this extremely low issuing speed of the extruded string is that, as a result, strains in the string are very largely avoided due to a low flow velocity of starting material during extrusion.

According to a further aspect of the present invention, there is provided apparatus for the production of articles consisting of ceramic material comprising: extruding means for extruding a starting material which is of a plastic consistency and contains clay to form a string having at least one longitudinal channel; drying means; firing means; cooling means; means for passing a gaseous medium through said at least one longitudinal channel of the string or sections thereof; and cutting means for subsequently dividing the string or sections thereof into individual articles.

Preferably, the apparatus includes conveyor means for moving the string or sections thereof through the drying means and through the firing means downstream of the extruding means, the cutting means being arranged downstream of the firing means.

Preferably, a line branching from at least one channel of the extruding means leads to a condenser, an outlet line of which leads to a mixing device arranged upstream of the extruding means.

The apparatus may include control means such as valves, flaps or the like for controlling the rate of flow of the gaseous medium flowing through said at least one longitudinal channel of the string or sections thereof, for example, as a function of the temperature and/or the moisture content of the gaseous medium flowing through the said at least one longitudinal channel, which control means can be arranged in a channel of the extruding means or in a connecting line thereof. The control means may include a probe for measuring the temperature and/or the moisture content of the gaseous medium flowing through said at least one longitudinal channel. The control means may include valve means comprising an expandible body which is arranged in one or more of the channels of the extruding means, the state of expansion of which controls the rate of flow of the gaseous medium through said at least one longitudinal channel of the string or sections thereof.

The apparatus may include connecting means which can be attached to a face of the string or sections thereof, which face has been produced by the cutting means, and a pressure device or an extraction device connected to the connecting means. The drying means and the firing means can be formed by two merging tunnel sections surrounding the conveying means.

The gaseous medium used can, in particular, be air which is caused to flow through said at least one longitudinal channel of the string or sections thereof, whereby drying of the ceramic material from the inner surface of the string or sections thereof is effected. In this way, substantially improved drying is obtained, compared with the drying hitherto possible, so that the disadvantages inherent in known processes, as explained above, are avoided. Provided that the air is also passed through the longitudinal channel of the string or sections thereof in the zone of the firing means, the air is strongly heated and as a result is highly effective for drying. The same effects can also be achieved by using heated steam as the gaseous medium.

The gaseous medium may be air enriched with carbon dioxide or with oxygen, whereby the properties of the ceramic material of the string or sections thereof are influenced. The carbon dioxide can be generated by atomizing oil in the air, the oil being burned in the zone of the firing means, thereby producing carbon dioxide.

Glass powder can be added to the gaseous medium, and this settles on the inner walls of the string or sections thereof and, in the zone of the firing means, fuses or pentrates into the surface to produce glazing. The direction of flow of the gaseous medium is selected to be either in the same direction or opposite direction to the direction of movement of the string or sections thereof depending on the particular application.

With this process, articles of a ceramic material, for example, earthenware or of porcelain can be manufactured.

BRIEF DESCRIPTION OF THE DRAWINGS

The invention is illustrated, merely by way of example, in the accompanying drawings, in which.

Throughout the drawings like parts have been designated by the same reference numerals.

DETAILED DESCRIPTION

Figure 1:
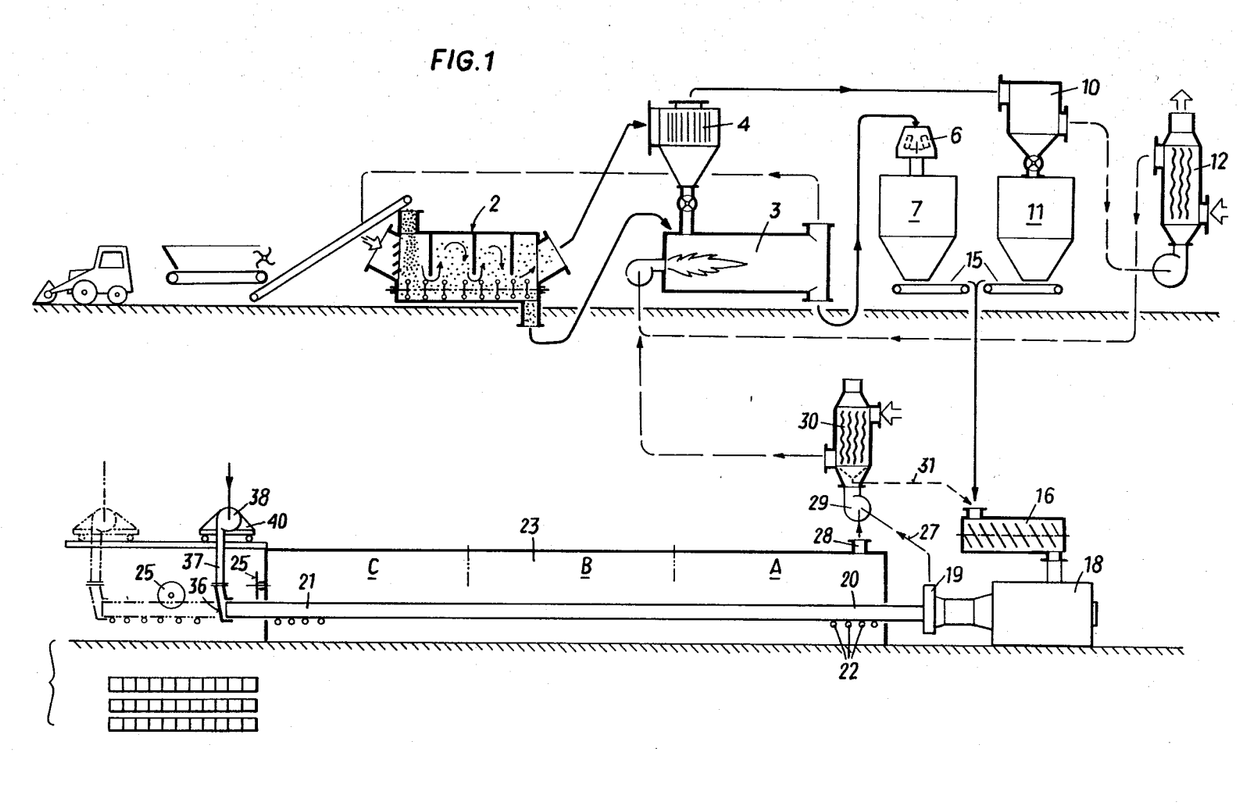
FIG. 1 is a diagrammatic representation of a first embodiment of apparatus according to the present invention for the production of hollow ceramic bricks.

A first embodiment of apparatus according to the present invention for the production of hollow ceramic bricks has a drying and classifying or screening device 2 to which raw clay material is fed. The coarse fraction of the screened or dried clay material is fed to a roasting device 3 in which initial burning of the clay material takes place at a temperature of, for example, 400° C. to 500° C. A dust fraction, entrained by air leaving the drying and classifying or screening device 2 is fed to a classifier 4. The part of the dust fraction which has a grain size of more than about 0.4 mm is discharged from the classifier 4 to the roasting device 3. In contrast, the part of the dust fraction, the grain size of which is below 0.4 mm, is discharged via a filter 10 to a clay material silo 11. The material leaving the roasting device 3 is discharged via a mill or grinding device 6 to an additives silo 7. The air leaving the filter 10 is passed through a heat exchanger 12 in which it heats air which is used for feeding the burners of the roasting device 3.

Additives from the silo 7 and the clay material from the silo 11 are fed in a desired ratio via a conveying device 15 to a mixer 16 for preparing a starting material from which the hollow ceramic bricks are to be made. By adding water and further additives, for example plasticisers, such as water glass, a starting material with a plastic consistency is produced. The starting material is discharged from the mixer 16 to a press 18, from the die 19 of which a continuous string 20 of the starting material emerges. This string 20 is passed by means of a transport device 22, for example conveyor rollers, through a tunnel 23. This tunnel 23 is divided into successive zones A, B and C, in which drying or heating, burning or firing, and cooling of the string respectively takes place. The firing zone B has walls provided with gas jets. After a burnt or fired string 21 has emerged from the tunnel 23, sections are severed from the string by means of a cutting device 25, and the sections are then divided, both transversely to the longitudinal direction of the string 21 and in the longitudinal direction of the string, and in particular in mutually perpendicular planes, into hollow bricks of conventional size. An end plate 36 which is provided with nozzles (not shown) and which is connected via a line 37 to a source 38 of compressed air can be attached to the free end of the string 21. The source 38 of compressed air is borne by a carriage 40 which is movable in the longitudinal direction of the string 21. Nozzles in the end plate 36 protrude into a longitudinal channel of the string 21.

The cores of the die 19 are formed with channels each of which terminates at one end on the side of the die in the longitudinal channels of the string 20 and whose other end is connected to an air channel 27. To enable air flow through the individual longitudinal channels of the string 20 to be controlled, the channels of the cores of the die 19 can lead into mutually separate lines, the air flows of which are controllable individually, for example by valves, such as flap valves. All these lines can lead to a single suction device 29. Air can be extracted from the tunnel 23 through a connection branch 28 by the suction device 29 whose outlet leads to a condenser 30. Condensate water discharged by the condenser 30 is passed via a line 31 to the mixer 16.

Additives which contain lime, pyrite, dolomite or similar materials which, during firing, undergo physical or chemical changes harmful to the final product, must have a particle size smaller than 0.4 mm, since they cause harmful influences above this particle size.

The operation of this apparatus will now be described. The drying and comminution of the raw clay material takes place in the drying and classifying or screening device 2. The material is initially burned or calcined in the roasting device 3. This is followed by grinding to a grain size of about 0.4 mm in the grinding device 6. The material discharged from the grinding device 6 is stored in the silo 7. The dust fraction escaping from the drying and classifying or screening device 2 is fed via the classifier 4 either to the roasting device 3 or to the filter 10, depending on grain size. The output from the filter 10 is passed to the silo 11 for the storage.

The mixer 16 is charged with additives from the silo 7 in a proportion of about 50% by weight up to about 80% by weight and with clay material from the silo 11 in a proportion of about 50% by weight down to about 20% by weight. The material fed from the silo 7 represents the additives, whereas the clay material, which has not been initially roasted, from the silo 11 represents the binder for the manufacture of the bricks. In the mixer 16, intensive mixing of the clay material with the additives takes place, with addition of the requisite quantity of water which is fed in a preheated state from the condenser 30. The press 18 effects the extrusion of the warm string 20 through the die 19 at a velocity of 0.3 to 5 cm/sec, preferably 1.2 cm/sec, and the string enters the tunnel 23 immediately after it has emerged from the die 19.

In the zone A of the tunnel 23, drying and heating of the string takes place. In the zone B, the string is fired at a temperature of about 800° C. to 1100° C., preferably 900° C. to 1050° C. Cooling of the string takes place in the zone C. After the fired string 21 has emerged from the tunnel 23, it is divided by the cutting device 25 into bricks of conventional size.

Air is passed through the tunnel 23 in a direction opposite to the direction of travel of the string 20, the air flowing over the surface of the string and being fed via the line 28 to the condenser 30. Moreover, air is introduced by the source 38 of compressed air, the line 37 and the end plate 36 into the longitudinal channels of the string 21, flows through the longitudinal channels and is likewise fed to the condenser 30 through the channels of the cores of the die 19 and the channel 27. The source 38 of compressed air, located on the carriage 40, follows the movement of the end face of the string 21. Due to the passage of air along the surface of the moist string 20 and through the longitudinal channels thereof, very intensive drying of the string 20 takes place in the drying zone A, both from the outer surfaces and the inner surfaces of the string. As a result, high uniformity and high efficacy in drying are achieved. The warm water removed from the air by the condenser 30 is fed via the line 31 to the mixer 16.

Due to the extremely low velocity at which the string 20 is passed through the die, strains in the string 20 are very largely avoided. Moreover, since the starting material contains a relatively small proportion of clay material and a relatively high proportion of additives, only relatively slight shrinkage of the string occurs, so that a very high dimensional accuracy of the final product can be achieved. Due to the fact that the string 20 emerging from the press 18 is not divided and that, in addition, it is not subjected to any other manipulations, any damage to the string 20 is avoided, so that the rejection rate is greatly reduced as compared with conventional processes. Additionally, since the string is dried, heated and fired in one pass, energy losses due to cooling after the drying step are avoided. Since the fired string is divided by means of a cutting device, high dimensional accuracy of the final products is also ensured in this way. Since, finally, the starting material has a very high filler content, the escape of water from the string in the drying zone A is substantially facilitated or the drying step is effectively favoured, so that the requisite energy demand for drying is close to its theoretical value and the generation of strains which increases the susceptibility to fracture is greatly reduced.

For the sake of completeness, it is pointed out that, in the apparatus shown in FIG. 1, initially burnt clay is utilized as the additive material. Instead of this material, other additives, which are inert to drying and burning, can also be used, such as metallurgical wastes, for example, fireclay, slag, pumice slag, natural pumice etc. The dust resulting from the division of the fired string 21 can also be used as an additive and hence recovered. The string 21 can be severed to give portions of the string in lengths of, for example, 10 m, and these are subsequently divided into individual bricks. Because of the hardness of the material, diamond wheels, for example, are required for this purpose.

Figure 2:
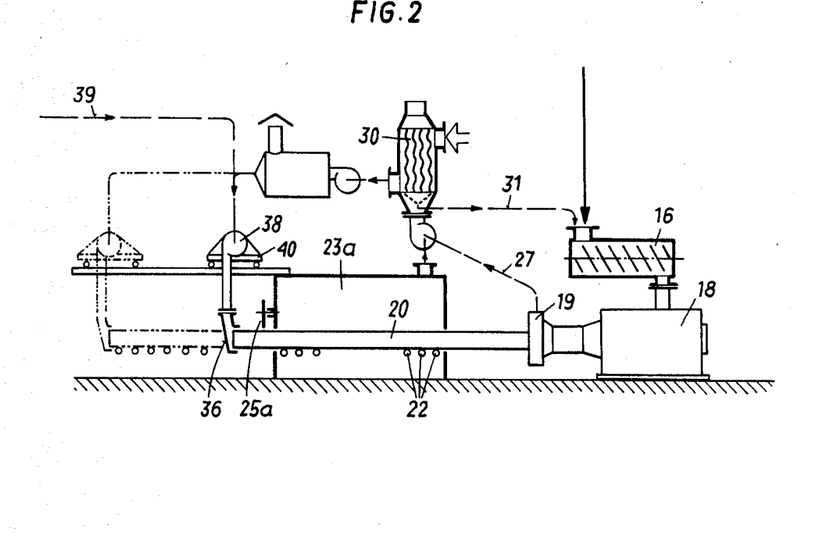
FIG. 2 is a diagrammatic representation of part of a second embodiment of apparatus according to the present invention for the production of hollow ceramic bricks.

FIG. 2 shows a second embodiment of an apparatus according to the present invention for the production of hollow ceramic bricks, this being a modification of the apparatus of FIG. 1. In the apparatus of FIG. 2, a further cutting device 25a is arranged in the tunnel 23 at the end of the drying zone A or after the exit from a separate drying chamber 23a, downstream of which a firing tunnel is provided. Furthermore, the carriage 40 for the source 38 of compressed air, which is movable in the direction of the movement of the string, is associated with the exit from the drying chamber 23a. In this case, the end plate 36 is attached to the free face of the string 20 which has been dried but not yet fired.

Thus the string, after it has emerged from the drying chamber 23a, is divided into sections, the length of which corresponds to a smaller or greater multiple of the height of one brick. The air is passed along the surface of the string and through the longitudinal channels of the string 20 moving through the drying chamber 23a, so that the string is dried on the outside and on the inside. The source 38 of compressed air follows the movement of the end face of the string 20. The source 38 of compressed air can be supplied via a line 39 with air from the roasting device or with warm air from the condenser 30. The further processing of the sections of the string 20 dried in this way is carried out in such a way that the string sections are then heated and fired in a kiln, then cooled and finally divided into individual bricks.

Figure 3:
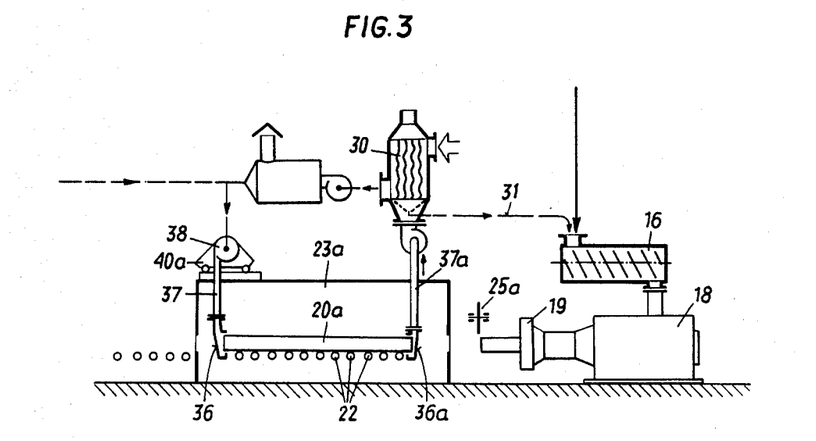
FIG. 3 is a diagrammatic representation of part of a third embodiment of apparatus according to the present invention for the production of hollow ceramic bricks.

FIG. 3 shows a third embodiment of an apparatus according to the present invention for the production of hollow ceramic bricks, this being another modification of the apparatus of FIG. 1. In this embodiment, the further cutting device 25a is located at the outlet of the string from the die 19 of the press 18, and the string is divided at that point into sections 20a, the length of which corresponds to a smaller or greater multiple of one brick. These string sections 20a are then introduced into the drying chamber 23a in which they are dried, warm air being passed along these sections for drying them, and end plates 36, 36a being attached to the two cutting surfaces of the sections for drying them from the inside. The end plate 36 is connected via the line 37 to the source 38 of compressed air, borne on a carriage 40a. The end plate 36a is connected via a line 37a to the condenser 30, the condensed water being fed via the line 31 to the mixer 16 and the warm air being recycled to the source 38 of compressed air.

After the sections 20a have been dried, they are fired and cooled, whereupon they are divided into individual bricks.

Figure 4:
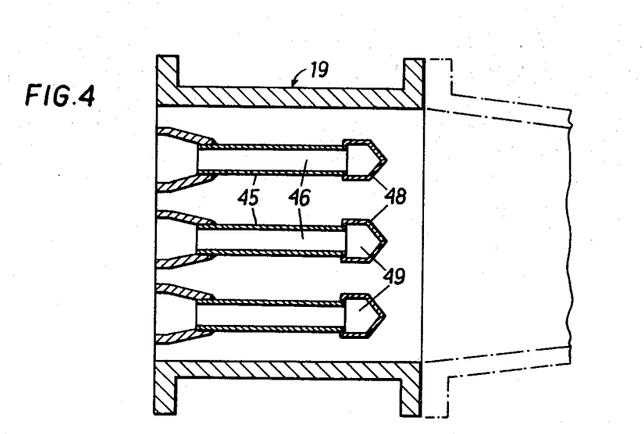
FIG. 4 shows a vertical section through a die of a press of apparatus according to the present invention.
Figure 5:
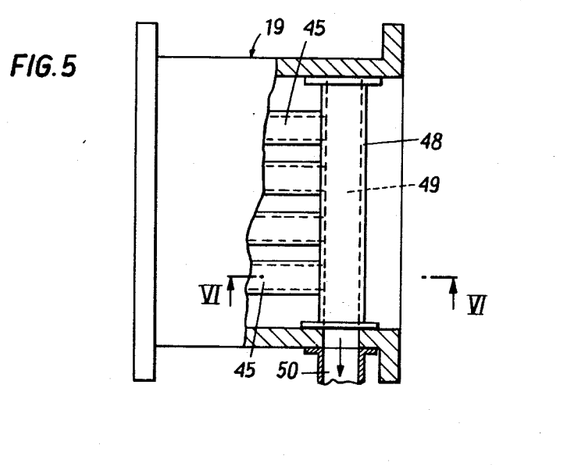
FIG. 5 shows a plan view of the die of FIG. 4.

As can be seen from FIGS. 4 and 5 of the drawing, the die 19 contains a plurality of cores 45 which are formed with channels 46. Horizontally adjoining cores 45 are carried by bridges 48 which are formed with channels 49. The air flowing through channels of the string can thus flow into the channels 46 of the cores 45 and flow out via the channels 49 of the bridges 48 and via connection branches 50.

Figure 6:
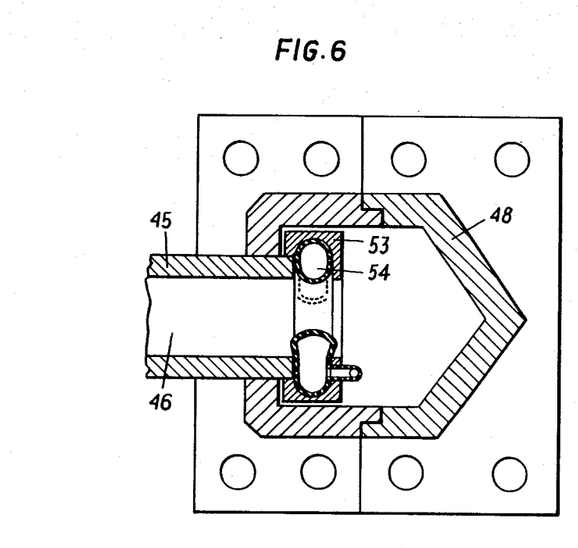
FIG. 6 is a section taken along the line VI—VI in FIG. 5, on an enlarged scale.

To enable the air flowing through the individual channels of the string to be controlled, a throttle is associated with each channel 46 of the cores 45, within the bridges 48—as shown in FIG. 6 of the drawing. The throttle can be formed by an annular tube 54 held in a frame 53. A probe, by means of which the moisture content and/or the temperature of the air flowing through the individual longitudinal channels of the string is measured, can be inserted through the connection branches 50, the channels 49 and the channels 46 into each of the longitudinal channels of the string. Depending on the measured values, the tubes 54 are expanded to a greater or lesser extent—as is shown in the drawing by full lines or dashed lines—whereby a control of the air rates passing through the individual longitudinal channels of the string can be achieved. In this way, uniform drying over the entire cross-section of the string can be effected, and this is of decisive importance for the quality of the final product. To make valves formed by the tubes 54 accessible, the bridges 48 are of split design.

For the sake of completeness, it is noted that any desired burners, such as oil burners or gas burners, can be provided in the firing zone B of the tunnel 23. Additionally, it is pointed out that the connecting bridges 48 for the cores 45 can also run vertically.

FIGS. 7a to 7i each show cross-sections through strings of ceramic material, from which various articles can be produced.

Figure 7A:
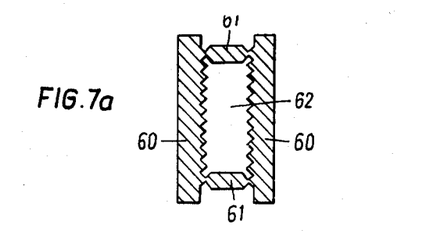
FIGS. 7a to 7i show, in cross-section, examples of articles which can be manufactured by a process according to the present invention.

In FIG. 7a, the string is formed by two wall plates 60 which are mutually connected by bridges 61, longitudinal channels 62 of the string being located on the inside of the plates 60 and the bridges 61. After the firing process of the string or sections of the string, the string or the sections of the string is or are cut to length, corresponding to the desired length of the plates 60. The bridges 61 are then removed, by which means individual wall plates 60 are produced.

Figure 7B:
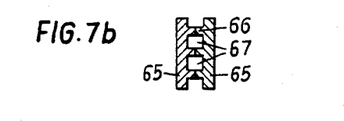

FIG. 7b shows a string which is used for the manufacture of at least two split plates 65. Between these two split plates which are mutually connected via bridges 66, there are longitudinal channels 67, through which a gaseous medium, for example air, can flow during the manufacturing process. After the string or the sections of the string have been fired, the portions of the string are again cut to length corresponding to the desired length of the split plates 65, whereupon the individual plates 65 are produced by dividing these sections of the string.

Figure 7C:
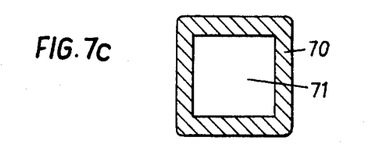

In FIG. 7c, a string for the manufacture of pottery ducts or furnace inserts 70 is shown. Ducts of this type have an approximately rectangular cross-section with a channel 71 on the inside. To produce these, the string or the sections of the string are cut to the required length.

Figure 7D:
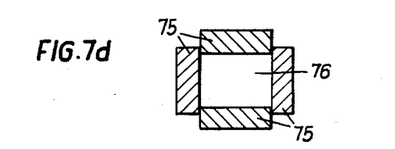

FIG. 7d shows a string for the manufacture of solid bricks 75. In this case, the string consists of four individual brick strings which are joined to one another in the region of their corners and which enclose a longitudinal channel 76. After the firing process, this hollow string is divided in the required manner, transversely to the longitudinal direction of the string and in the longitudinal direction of the string, whereby the individual bricks 75 are produced.

Figure 7E:
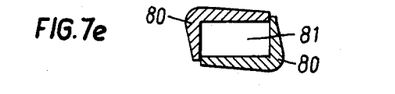

In FIG. 7e, a similar string is shown, which is used for the production of profile bricks 80 for the manufacture of stairs. The string is here formed by two profile bricks 80 of this type, which are joined to one another along their free ends and between which a longitudinal channel 81 is formed. In this case, the string or the sections of the string are, after firing, cut to length as required, and the sections are then divided into the individual profile pieces 80.

Figure 7F:
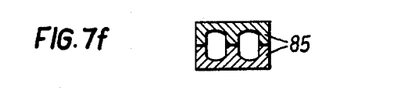

In FIG. 7f, a string is shown which is used for the production of two cable-ducting blocks 85.

Figure 7G:
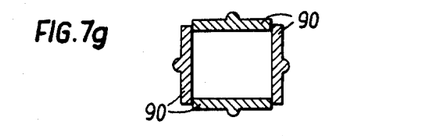

FIG. 7g shows a string used for the production of four roof tiles 90.

Figure 7H:
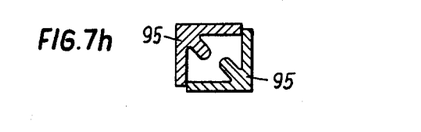

FIG. 7h shows a string used for the production of two decorative strips 95.

In all these illustrative embodiments, the string or the sections of the string are, after firing, cut to length as required, and these sections are then divided into the individual blocks, tiles or strips.

Figure 7I:
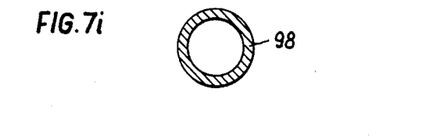

Finally, FIG. 7i shows a tubular string which is used for the production of drain pipes, stoneware pipes or flue ducts 89. Curved plates can also be fabricated by dividing such pipes.

The building bricks listed above can consist of brick material, stoneware material or porcelain material, and this does not lead to any modification or restrictions with respect to production in accordance with the present invention.

Air is used in particular as the gaseous medium which is passed through the longitudinal channel of the strings. As a result of the flow of air through at least one channel of the string, substantially better drying is achieved than was hitherto possible. Additionally, by controlling the air flow over the cross-section of the string, more uniform drying of the string from the inside than was hitherto achievable is also made possible.

Analogous effects can also be obtained with superheated steam, which can likewise effect drying of the string from the inside.

In addition, air enriched with carbon dioxide or with oxygen can also be passed through at least one longitudinal channel, whereby the properties of the ceramic material can be influenced during firing. The carbon dioxide can be generated by atomising oil into the air being passed through the longitudinal channel; the oil is burned in the firing zone to form carbon dioxide.

Furthermore, glass dust or metal dust can also be added to the gaseous medium, the dust settling on the inner walls of the string and fusing in the firing zone or penetrating into the surface, whereby the latter is glazed or coated with metal. Depending on the application, the direction of the flow of the gaseous medium is selected to be in the direction of movement of the string or in the opposite direction. With this process, it is also possible to achieve a refining of the inner walls of the string in other ways.

The present invention may be embodied in other specific forms without departing from the spirit or essential attributes thereof, and it is therefore desired that the present embodiments be considered in all respects as illustrative and not restrictive, reference being made to the appended claims rather than to the foregoing description to indicate the scope of the invention.

What is claimed is:

1. A process for producing plural articles made of a ceramic material, comprising the steps of: extruding a starting material which has a plastic consistency and contains clay so as to form an elongate string having a longitudinal channel therethrough; drying, firing and cooling said string, including the step of causing a stream of a gas to flow through said longitudinal channel in said string in a predetermined direction; and dividing said string into a plurality of said articles.

2. The process as claimed in claim 1, wherein said step of dividing said string into said articles takes place after said firing step.

3. The process as claimed in claim 1, including the step of initially dividing said string into sections which each correspond to a plurality of said articles, said initial dividing step taking place after said drying step and before said firing step.

4. The process as claimed in claim 1, including the step of initially dividing said string into sections which each correspond to a plurality of said articles, said initial dividing step taking place immediately after said step of extruding said string.

5. The process as claimed in claim 1, wherein said step of dividing said string into said articles is carried out in one of a direction transverse of and a direction longitudinal of said string.

6. The process as claimed in claim 2, wherein said steps of drying, firing and cooling are successively carried out in respective zones and said dividing step is carried out thereafter, and wherein said stream of gas is introduced into said longitudinal channel of said string at a point of division of said string which is downstream of said zone at which said firing step is carried out, said predetermined direction being opposite to a direction of movement of said string through said zones.

7. The process as claimed in claim 3, wherein said stream of gas is introduced into said longitudinal channel of said string at a point of division of said string which is located downstream of said zone at which said drying step is carried out, said predetermined direction being opposite to a direction of movement of said string.

8. The process as claimed in claim 4, wherein said stream of gas is caused to flow through the longitudinal channel in each said section of said string.

9. The process as claimed in claim 1, wherein said step of causing a stream of gas to flow is carried out by one of means for drawing and means for forcing a stream of gas through said longitudinal channel in said string.

10. The process as claimed in claim 1, wherein a rate of flow of said gas through said longitudinal channel is controlled in dependence on one of the temperature of said gas and the moisture content of said gas.

11. The process as claimed in claim 1, including the step of causing said stream of gas flowing through said channel to subsequently flow through a condenser, wherein water vapor absorbed by said gas as it flows through said longitudinal channel is recovered by said condenser, and including the step of mixing water recovered by said condenser with other ingredients in order to produce additional quantities of said starting material.

12. The process as claimed in claim 1, wherein said starting material which is extruded contains about 50% to 20% by weight of clay and about 50% to 80% by weight of an additive which is inert during drying and firing.

13. The process as claimed in claim 2, including the step of utilizing waste material produced during said dividing step as an ingredient of said starting material.

14. The process as claimed in claim 1, wherein said string is extruded continuously.

15. The process as claimed in claim 1, wherein said gas in one of air, carbon dioxide, steam, a rare gas, and a mixture of air, carbon dioxide, steam, and said rare gas.

16. The process as claimed in claim 15, including the step of adding one of a liquid and a powder to said gas before it passes through said longitudinal channel in said string.

17. The process as claimed in claim 1, wherein said step of causing said stream of gas to flow through said longitudinal channel of said string effects drying of the interior surfaces of said string.

18. The process as claimed in claim 1, wherein inner surfaces of said string are influenced by said stream of said gas flowing through said longitudinal channel of said string.

19. The process as claimed in claim 1, wherein said drying step and said step of causing said stream of gas to flow through said longitudinal channel are carried out simultaneously.

20. An apparatus for producing plural articles made of a ceramic material, comprising: extruding means for extruding a starting material which has a plastic consistency and contains clay so as to form an elongate string having a longitudinal channel therethrough; drying means for drying said string; firing means for firing said string; cooling means for cooling said string; means for causing a stream of a gas to flow through said longitudinal channel in said string in a predetermined direction; and cutting means for dividing said string into a plurality of said articles.

21. The apparatus as claimed in claim 20, including conveyor means at a location downstream of said extruding means for moving said string through said drying means and said firing means, said cutting means being downstream of said firing means.

22. The apparatus as claimed in claim 20, wherein said extruding means includes a channel communicating with said channel in said string and with a condenser, said condenser having an outlet line which leads to a mixing device which is arranged upstream of said extruding means.

23. The apparatus as claimed in claim 22, including control means for controlling the rate of flow of said gas through said longitudinal channel of said string, said control means being arranged in said extruding means.

24. The apparatus as claimed in claim 23, wherein said control means includes probe means for measuring one of the temperature and the moisture content of said gas flowing through said longitudinal channel in said string.

25. The apparatus as claimed in claim 23, wherein said control means includes valve means having an expandible body which is arranged in said channel in said extruding means, the degree of expansion of said body controlling the rate of flow of said gas through said longitudinal channel in said string.

26. The apparatus as claimed in claim 21, including connecting means which can be attached to a surface of said string which has been produced by said cutting means, and wherein said means for causing said stream of said gas to flow through said longitudinal channel in said string includes one of pressure means and vacuum means connected to said connecting means.

27. The apparatus as claimed in claim 21, wherein said drying means and said firing means are formed by two tunnel sections which surrounds said conveying means and which merge with each other.

28. The apparatus as claimed in claim 20, wherein said extruding means produces a plurality of said longitudinal channels in said string, and wherein said means for causing a stream of said gas to flow is adapted to cause a stream of said gas to flow through each of said longitudinal channels in said string.

29. The apparatus as claimed in claim 20, wherein said means for causing said stream of said gas to flow includes an end plate which is cooperable with an end of said string remote from said extruding means, said end plate having means defining a channel therein which communicates with said channel in said string, said stream of gas flowing through said channel in said end plate and through said channel in said string.

30. The apparatus as claimed in claim 29, wherein said extruding means includes a die having a core which produces said channel in said string, said extruding means having means defining a channel therein which extends through said core and communicates with said channel in said string, said stream of gas flowing through said channel in said string and through said channel in said extruding means.

31. The apparatus as claimed in claim 30, wherein said means for causing said stream of gas to flow through said channel in said string includes a source of compressed gas and a vacuum device, said source of compressed gas being in communication with said channel in said end plate and causing said stream of gas to flow through said channel in said end plate and into said channel in said string, and said vacuum device communicating with said channel in said extruding means and causing said stream of said gas in said channel in said string to flow through said channel in said extruding means.

32. The apparatus as claimed in claim 29, wherein said means for causing said stream of gas to flow through said channel in said string includes a carriage supported for movement in a direction approximately parallel to a direction in which said string is extruded by said extruding means, said end plate being supported on said carriage.

* * * * *